United States Patent
Pridham

(10) Patent No.: US 7,255,373 B2
(45) Date of Patent: Aug. 14, 2007

(54) COUPLING OR TRANSITION FITTING FOR THE CONNECTION OF METAL OR PLASTIC PIPES

(75) Inventor: Malcolm Pridham, Sheidow Park (AU)

(73) Assignee: Philmac Pty Ltd, North Plympton, South Australia (AU)

( * ) Notice: Subject to any disclaimer, the term of this patent is extended or adjusted under 35 U.S.C. 154(b) by 775 days.

(21) Appl. No.: 10/682,614

(22) Filed: Oct. 8, 2003

(65) Prior Publication Data

US 2004/0090067 A1   May 13, 2004

Related U.S. Application Data

(63) Continuation of application No. PCT/AU02/00986, filed on Jul. 25, 2002.

(30) Foreign Application Priority Data

Jul. 25, 2001   (AU) ..................... PR6609
Jun. 21, 2002   (AU) ..................... PS3081

(51) Int. Cl.
*F16L 33/00* (2006.01)
(52) U.S. Cl. ............... 285/249; 285/255; 285/332.1
(58) Field of Classification Search ............ 285/249, 285/255, 332.1, 246, 245
See application file for complete search history.

(56) References Cited

U.S. PATENT DOCUMENTS

| | | | | |
|---|---|---|---|---|
| 896,204 A | * | 8/1908 | Glauber | 285/332.1 |
| 1,802,572 A | * | 4/1931 | Phillips | 285/249 |
| 3,310,323 A | * | 3/1967 | Galloway et al. | 285/249 |
| 3,679,239 A | * | 7/1972 | Schmitt | 285/148.22 |
| 4,119,335 A | * | 10/1978 | Rieffle et al. | 285/337 |
| 5,593,186 A | * | 1/1997 | Harris | 285/23 |

FOREIGN PATENT DOCUMENTS

| | | |
|---|---|---|
| EP | 0690256 A1 | 1/1996 |
| EP | 0 890 774 A1 | 1/1999 |
| JP | 31334177 | 12/1977 |
| JP | 9060771 | 3/1997 |
| JP | 10169860 | 6/1998 |

* cited by examiner

*Primary Examiner*—David Bochna
(74) *Attorney, Agent, or Firm*—Francis Law Group

(57) ABSTRACT

A pipe coupling having a radially deformable housing, wherein a pipe is freely insertable into the housing bore and a nut causes engagement of the grip ring with the pipe. The housing bore including a plurality of outwardly extending projections. The grip ring including a plurality of apertures adapted to receive the housing projections and a plurality of inwardly extending burst hole projections. Tightening of the nut causes the grip ring to be forced both radially and longitudinally, whereby the gripping member substantially restricts longitudinal and rotational movement of the pipe.

14 Claims, 4 Drawing Sheets

COUPLING OR TRANSITION FITTING FOR THE CONNECTION OF METAL OR PLASTIC PIPES

This application is a continuation of International Application No. PCT/AU02/O0986, filed Jul. 25, 2002; for which priority is claimed from Australia Application Nos. PR6609, filed Jul. 25, 2001 and PS3081 filed Jun. 21, 2002; the disclosures of which are incorporated herein by reference.

The present invention relates to a coupling or transition fitting for the connection of pipes of the type having a gripping member. In particular it relates to an improvement in the gripping member to enable the coupling or transition fitting to be used on metal as well as plastic pipes.

BACKGROUND OF THE INVENTION

Couplings and transition fittings of the type having a gripping member are well known, see for example Applicants U.S. Pat. No. 5,593,186. In general these couplings include a nut, body, gripping member having a plurality of inwardly directed barbed projections, as well as a sub-assembly of a compression sleeve and resilient gasket ring that is typically permanently attached to the inner end of the compression sleeve. The nut and the gripping member include abutting tapered surfaces. A pipe end is freely insertable through the sub-assembly and into a socket in the body of the coupling. As the nut is tightened it exerts both a radial and longitudinal force on the grip ring that in turn longitudinally exerts a force on the sleeve and gasket ring. The gasket ring encounters an abutment in a socket in the body, and further tightening of the nut then further radially compresses the gripping member so that its inwardly directed barbed projections engage the outer surface of a pipe to which the coupling is attached. There may also be provided abutment surfaces within the body of the coupling and the nut that abut inner and outer surfaces of a flange outstanding from the outer end of the compression sleeve.

One skilled in the art will appreciate that as the nut is tightened, the tapered surface of the nut acts upon the tapered surface of the gripping member causing it to be both compressed and urged into the body. As the gripping member engages the pipe it is also drawn into the assembly.

Whilst this works well on plastic pipes, it does not work well on metal pipes because the gripping ring, itself made of plastic material, does not possess sufficient strength or hardness to engage a metal pipe. Annular plastic barbs simply can not engage metal pipes with sufficient resilience and even under a small longitudinal force on the pipe, the pipe generally disengages from the coupling.

To overcome this problem, it has been known to modify the gripping member to include protruding metal strips or teeth (generally stainless steel) extending longitudinally along the pipe. However, these modified gripping members are not suitable for plastic pipes since the plastic is easily damaged and cut by the protruding strips. Further, the softer the material, the greater the surface contact required between the gripping members projections and the pipe so that in soft pipes the so modified gripping members are generally unsuitable.

The main object of this invention is therefore to overcome the abovementioned problems or at least provide the public with a useful alternative by providing improvements whereby the body, nut and gripping member (compression ring) form a preliminary assembly through which can be inserted either a metal or a plastic pipe, which is secured by tightening the nut, or removed by unscrewing the nut.

SUMMARY OF THE INVENTION

Therefore, in one embodiment of the invention, there is proposed a retaining device for a pipe coupling comprising:

a radially deformable housing having an internal bore adapted to receive a pipe therein, said internal bore having an internal surface that includes a plurality of outwardly extending first projections; and a radially deformable gripping member having longitudinal and parallel axes, and first and second surfaces, said first surface being matingly similar to said housing internal surface, said gripping member including a plurality of apertures adapted to receive said outwardly extending first projections when said gripping member is disposed in said housing internal bore, said gripping member further including a plurality of burst hole projections that extend outwardly from said second surface, each of said burst hole projections having a plurality of walls, at least one of said walls having an orientation that is not parallel to said longitudinal and parallel axes of said gripping member, whereby said burst hole projections substantially restrict longitudinal and rotational movement of said pipe when engaged thereto.

In preference, said housing has a generally cylindrical shape.

Preferably, said gripping member is fixedly retained within the housing bore in a snap fit arrangement.

In preference, said burst hole projections are aligned in at least one annular row.

In preference, said gripping member includes five annular rows of said burst hole projections that extend across said gripping member.

In preference, there are at least a first plurality of said burst hole projections have different heights.

In preference, said housing comprises a split-ring type housing.

In a further embodiment of the invention, there is proposed a pipe coupling wherein a pipe is freely insertable into the coupling, comprising:

a hollow body having external threads and a tapered inner surface;

a nut having internal threads co-operable with said body external threads at a first end and an outwardly converging inner tapered surface at a second end; and a deformable gripping member assembly having a housing and a gripping member, said housing having an internal port adapted to receive said gripping member therein, said housing port having an internal surface, said gripping member having longitudinal and parallel, axes, and first and second surfaces, said first surface being matingly similar to said body internal surface, said gripping member including a plurality of burst hole projections that extend outwardly from said second surface, each of said burst hole projections having a plurality of walls, at least one of said walls having an orientation that is not parallel to said longitudinal and parallel axes of said gripping member, wherein upon tightening of said nut, said nut tapered inner surface abuts against and exerts a force on said first surface of said gripping member in substantially longitudinal and radial directions to thereby cause said gripping member to be urged both radially and longitudinally into said pipe when said pipe is inserted into said coupling, whereby said gripping member substantially restricts longitudinal and rotational movement of said pipe.

In preference, said burst hole projections are aligned in at least one annular row.

In preference, said gripping member includes five annular rows of said burst hole projections that extend across said gripping member.

In preference, at least a first plurality of said burst hole projections have different heights.

In preference, said housing internal surface includes a plurality of outwardly extending projections.

In preference, said gripping member includes a plurality of apertures adapted to receive said housing projections when said gripping member is disposed in said housing internal port.

BRIEF DESCRIPTION OF THE PREFERRED EMBODIMENT

The accompanying drawings, which are incorporated in and constitute a part of this specification, illustrate an implementation of the invention and, together with the description, serve to explain the advantages and principles of the invention. In the drawings, FIG. 1 is a central elevational section that shows a pipe end inserted through a sub-assembly comprising a nut, gripping member assembly, sleeve, and gasket and into a socket in the body of a fitting embodying the present invention;

DESCRIPTION OF THE PREFERRED EMBODIMENT

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

It is to be understood that reference to the following transition fitting is meant by way of example only and the design embodying the present invention may equally well be used on other pipe couplings and/or transition fittings such as Applicant's coupling fitting described in U.S. Pat. No. 5,593,186, Australian provisional patent application PR2231 and many other couplings for pipes of the type having a split or grip ring.

Figure 1:
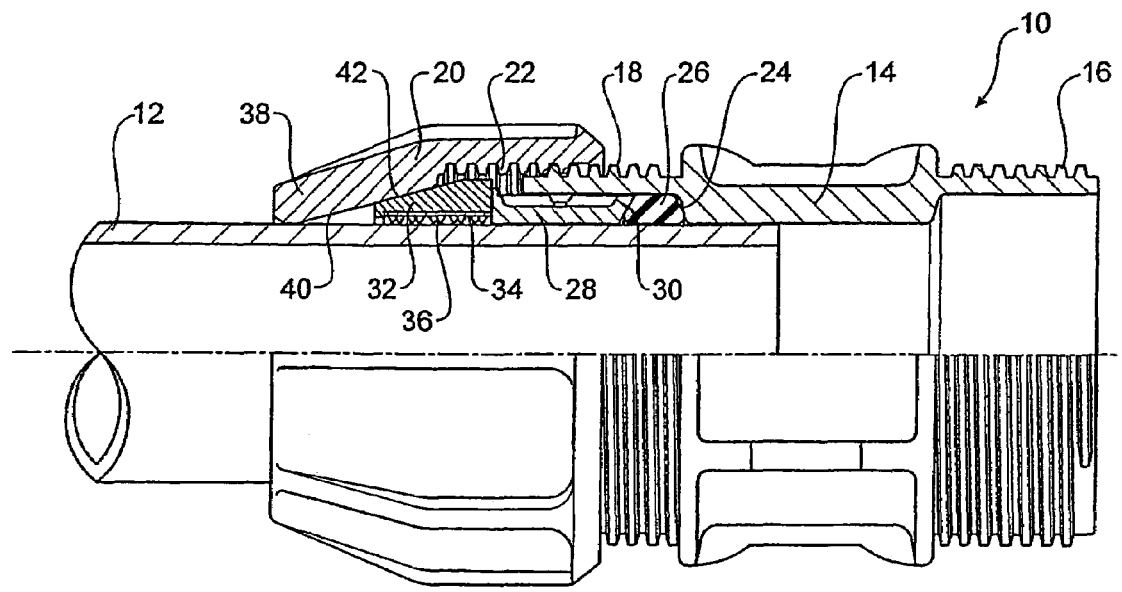
Figure 2:
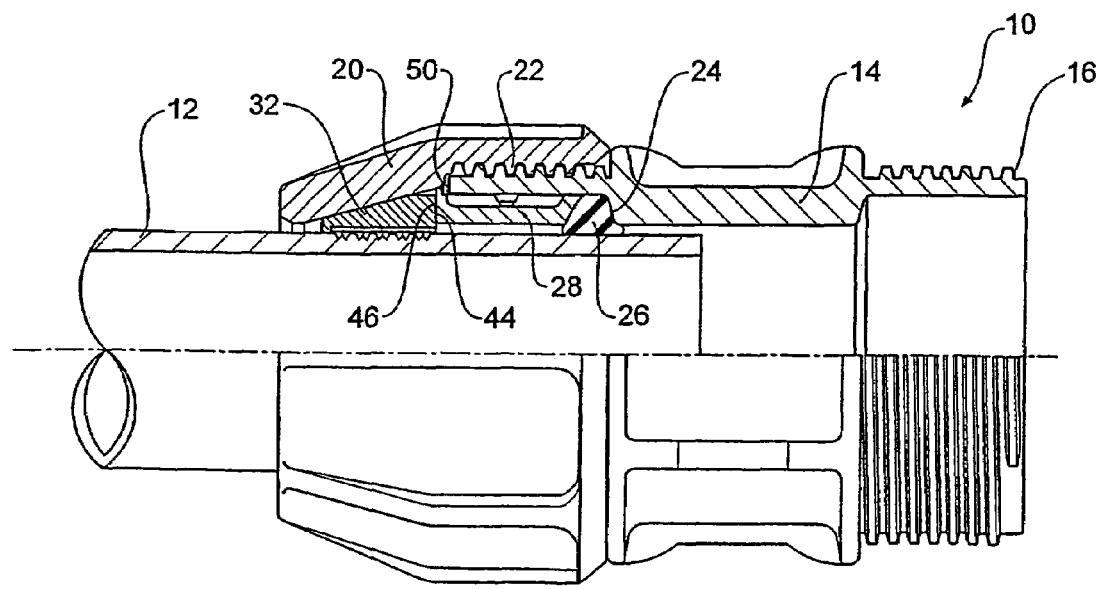
FIG. 2 is a similar section showing the configuration of the sub-assembly when the nut is tightened onto the body.

Shown in FIGS. 1 and 2 is a coupling 10 for outer surface engagement of a pipe 12 includes a longitudinal body 14 having male threads 16 and 18 at each end, the threads adapted for use by nut 20 having internal threads 22 that engage the body threads 16 and 18. FIGS. 1 and 2 however only illustrate one nut 20 engaging threads 18. It is therefore to be understood that the present invention may equally well be used on a pipe coupling having symmetrical ends as well as pipe couplings where one of the ends is adapted for connection to a different type of pipe and may accommodate a different fitting.

The body 14 includes a shoulder defining generally an annular outwardly diverging surface 24 constituting an abutment surface for a resilient gasket ring 26.

Surrounding the pipe 12 is a compression sleeve 28 having an outwardly diverging tapered surface 30 abutting the resilient gasket ring. Those skilled in the art will appreciate that any inward relative motion between the sleeve surface 30 and annular surface 24 will exert a radially inward force on the gasket ring 26 causing it to deform and provide for a seal between the body 14 and pipe 12 as illustrated in FIG. 2.

Adjacent but axially outwardly of sleeve 28 is a gripping member assembly including a housing 32 and a metal band or ring 34 that are releasably attached to each other, said ring 34 including a plurality of barb projections 36.

The nut 20 includes a tail 38 having an outwardly converging inner tapered surface 40. The housing 32 includes an outwardly converging outer tapered surface 42 the included angle of which is approximately the same as the tapered surface 40 of the nut.

Upon tightening of the nut 20, its inner surface 40 abuts and slides along the housing outer surface 42 causing both a radial and compressive force to be experienced by the housing 32. The housing includes an inner shoulder 44 that abuts against the inner shoulder 46 of the sleeve 28 transferring any longitudinal force and thereby acting to compress the gasket ring 26.

The nut includes an abutment surface 48 that upon tightening approaches and may abut the end surface 50 of the body, this depending on the relative size and aspect ratio of the part making up the coupling.

Assuming that the pipe 12 is inserted into the coupling as shown in FIGS. 1 and 2, initial tightening of the nut 20 on the body 14 causes both a radial and longitudinal force on the housing 32 to bear against and engage the pipe 12. Continued tightening of the nut when the gasket ring has been compressed causes the housing and the metal band to be compressed even further forcing the projections with some force against the pipe 12.

Those skilled in the art will appreciate that the projections will bite into the pipe, the amount of bite or penetration depending on the relative materials. Use of metal projections on a soft plastic pipe causes them to bite into the pipe, whilst use of metal projections on a metal pipe typically causes them to bite to a lesser extent but still engage the pipe to resist any outward movement of the pipe from the body.

The skilled addressee will also appreciate that the configuration of the housing and the metal band enables the present invention to be used for pipes that may vary in diameter. This comparison is illustrated in FIGS. 1 and 2, where even though the pipe in FIG. 2 is smaller than that in FIG. 1, the fitting is able to accommodate and suitably seal the smaller pipe by virtue of the properties of the grip ring assembly and the seal.

Figure 3:
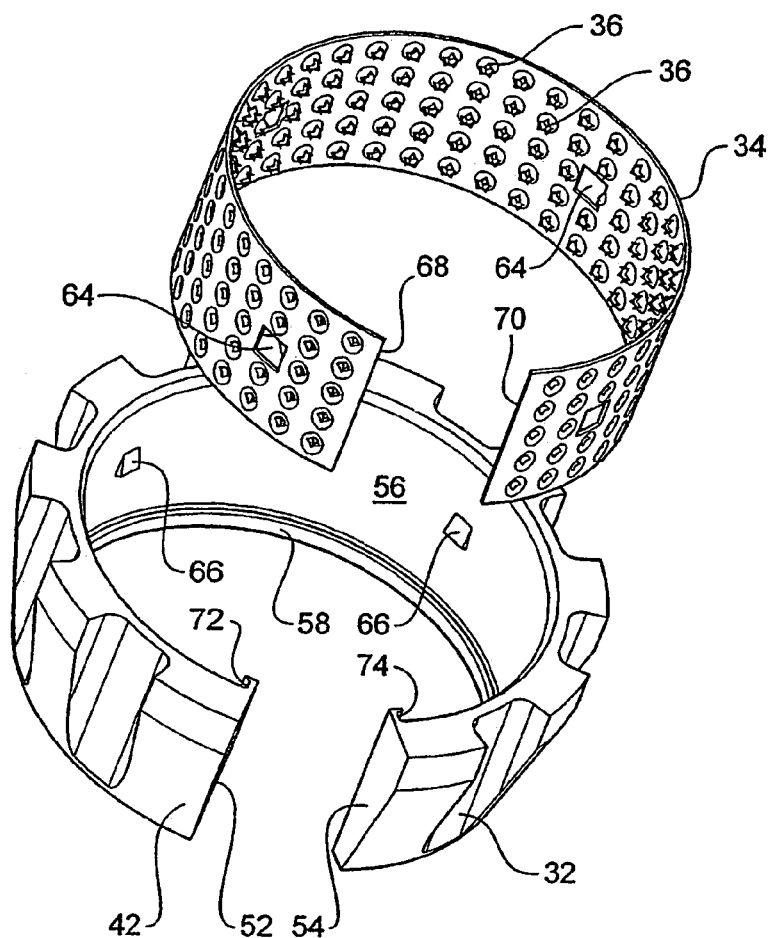
FIG. 3 is an exploded perspective view of a gripping member assembly embodying the preset invention including a housing and a metal band.
Figure 4:
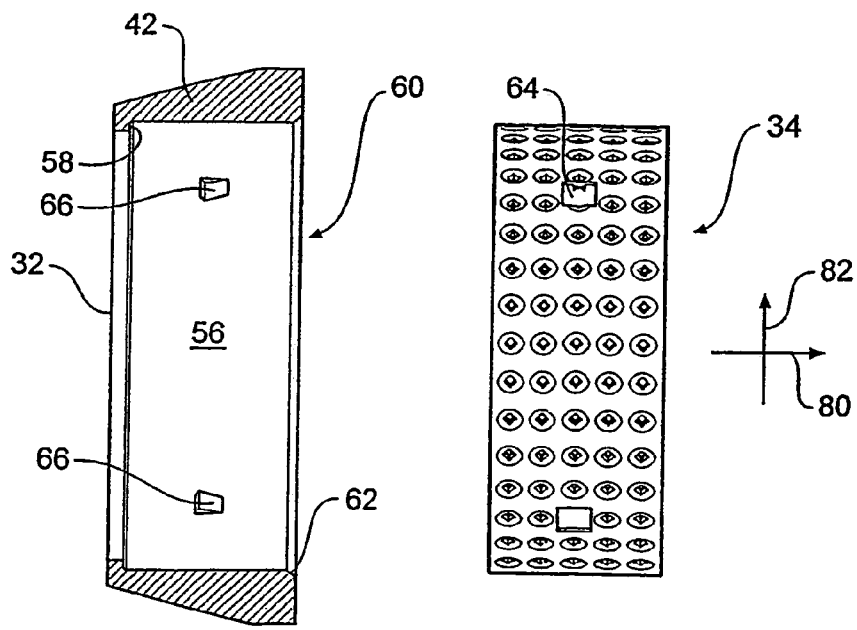
FIG. 4 is an exploded side view of the gripping member assembly of FIG. 1.

The housing and the metal band are illustrated in more detail in FIGS. 3 and 4. The housing 32 needs to be both radially deformable and is a split type housing having two ends 52 and 54 that approach each other as the housing is compressed. The housing 32 includes a flat annular surface 56 defined at one end by a flange 58 and at the other end opening 60 having an outwardly diverging lip 62. The metal band 34 is a split ring correspondingly shaped to and mounted on surface 56. The metal band 34 includes apertures 64 that engage appropriately positioned projections 66 on the surface 56. Ends of the metal band 68 and 70 engage slots 72 and 74 respectively, the slots located at the ends 52 and 54 of the housing 32. It will now be apparent to the skilled addressee that when the metal band has so been located within the housing it is locked into place forming a single gripping ring assembly that moves in uniform and where any forces experienced by the housing are transmitted to the metal band.

Typically the metal band includes a plurality of inwardly extending projections 36, this embodiment illustrating five annular rows of projections, the projections in each row also longitudinally aligned. It is understood that the number and relative orientation of projections is not intended to be limited to this particular embodiment.

The projections are typically manufactured by using a metal punching process. This method of manufacture has particular advantages that shall now be discussed.

When using a stamping process, a flat band of metal can be punched simultaneously by a plurality of tools, each tool responsible for making one projection. Typically the tool used completely penetrates through the metal band causing a break through the band and resulting in a burst hole having sharp protrusions, the number, shape, and orientation depending to some degree on the shape of the tool.

Figure 5:
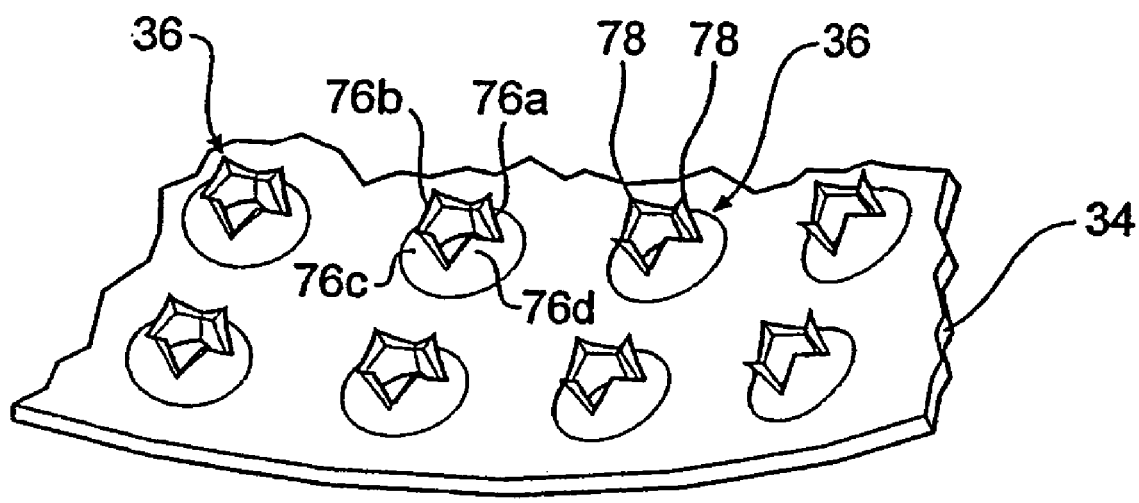
FIG. 5 is a partial perspective view of the metal band illustrating the projections in detail.

As illustrated in FIG. 5, use of a square or rectangular shaped tool results in the projections being of the same type. When a four sided tool is used, punching through the metal band results in the metal flowering with there being defined four walls 76a, 76b, 76c, and 76d, the top of each wall ending in a sharp apex 78. Further, the walls are oriented in the same orientation as was the tool during the punching process.

It has therefore been discovered, that if the tools used to punch though the metal band are oriented such that their sides are not parallel to either the longitudinal axis 80 or the parallel axis 82 the walls defining each of the projections are also not parallel to either of those axis. Thus, as shown in FIG. 5, if the tool is a square shaped tool and its sides are at an angle of some 45 degrees to either axis 80 or 82, than the walls 76 of the projections are also oriented at an angle of some 45 degrees. These types of projections are advantageous for several reasons.

Firstly, the projections' having multiple sharp apexes assists in engaging the pipe. Secondly the orientation of the projections not parallel to either axis 80 or 82 ensures that each projection resists both longitudinal and rotational motion of the pipe within the coupling. Those skilled in the art will now appreciate that if the walls of the projections were longitudinally axially aligned, the coupling would not be as effective in resisting longitudinal movement of the pipe whilst if the walls of the projections were radially aligned the coupling would not be as effective in resisting relative rotational movement of the pipe with respect to the coupling, that is, the housing.

It has been found that pressed metal burst holes or teeth provide sufficiently sharp or jagged edge to engage a plastic pipe and yet have the inherent strength to also engage a metal pipe. The punch system allows one to use a very thin strip of metal that is flexible but allows one to put onto that metal surface a number of projections that aid in the gripping of the pipe.

It will be appreciated by those skilled in the art that the metal band must be sufficiently thin to allow it to follow the contours of the gripping ring housing and yet thick enough to provide the necessary strength to support the projections.

The projections may be arranged in annular rows, each row having a plurality of circumferentially spaced projections. For smaller diameter pipes it has been found sufficient for only several annular rows of projections. Larger pipes may very well require multiple annular rows.

Figure 6:
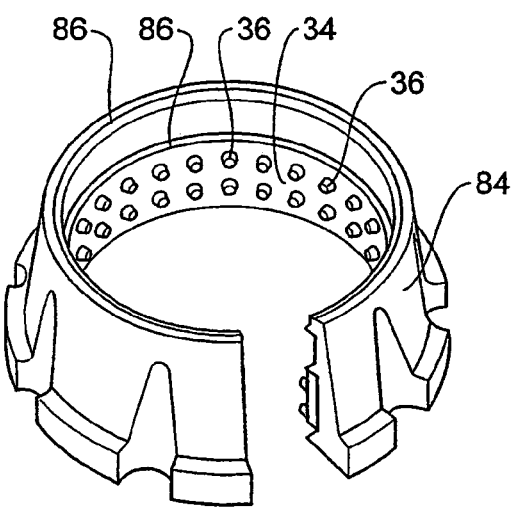
FIG. 6 is a perspective view of a gripping member assembly, including a grip-ring and a metal band having metal projections, according to a second embodiment of the present invention.

Referring now specifically to FIG. 6 here is shown an alternative embodiment of the present invention including a grip-ring assembly having a grip-ring 84, the grip-ring 84 adapted to snap-fittingly hold a metal band 34 with multiple barb projections 36, the grip-ring 84 also having annular projections 86 adapted to engage a pipe 12. This embodiment of the grip-ring assembly thus has a combination of both metal projections that are located on the metal band and plastic projections that are a part of the grip-ring with there being two-rows of metal projections on the metal band 34.

Figure 7:
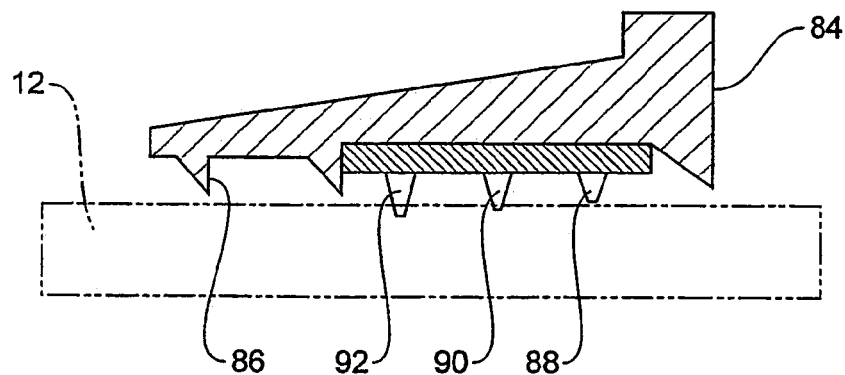
FIG. 7 is a partial cross-sectional view of a gripping member assembly of FIG. 6 before tightening of the coupling and where the metal projections are of a non-uniform size across the metal band.
Figure 8:
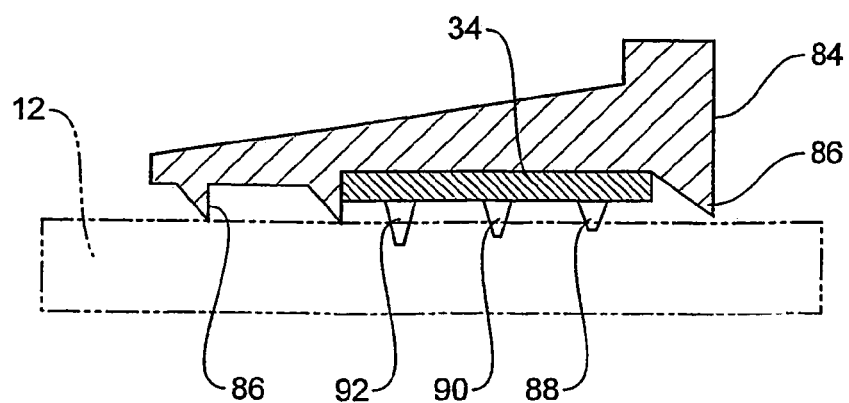
FIG. 8 is a partial cross-sectional view of a gripping member assembly as in FIG. 7 but when the coupling has been tightened onto a pipe.

It is to be understood that the relative hight and cross-sectional shape of the projections may vary. As illustrated in FIGS. 7 and 8 with reference to the second embodiment of the grip ring assembly as shown in FIG. 6, the height of the projections may vary with distance into the grip-ring, with the forward most projections 88 being smaller than the middle ones 90 that are themselves smaller than the inside ones 92. The projections of FIGS. 7 and 8 are also seen to have a flat apex and in contrast to the first embodiment are not of the burst metal type but rather of a conical shape type. It is however not intended to limit the size differential to one that decreases uniformly. For example, variable height projections may be randomly scattered along the metal band.

Those skilled in the art will appreciate that the various metal on the metal band may be randomly scattered along the surface of the metal band. The relative sizes of the projections may also be varied.

Although the invention has been shown and described in what is conceived to be the most practical and preferred embodiment, it is recognized that departures may be made therefrom within the scope and spirit of the invention, which is not to be limited to the details disclosed herein but is to be accorded the fill scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. A retaining device for a pipe coupling comprising:
   a radially deformable housing having an internal bore adapted to receive a pipe therein, said internal bore having an internal surface that includes a plurality of outwardly extending first projections; and
   a radially deformable gripping member having longitudinal and parallel axes, and first and second surfaces, said first surface being matingly similar to said housing internal surface, said gripping member including a plurality of apertures adapted to receive said outwardly extending first projections when said gripping member is disposed in said housing internal bore, said gripping member further including a plurality of burst hole projections that extend outwardly from said second surface, each of said burst hole projections having a plurality of walls, at least one of said walls having an orientation that is not parallel to said longitudinal and parallel axes of said gripping member, whereby said burst hole projections substantially restrict longitudinal and rotational movement of said pipe when engaged thereto.

2. The retaining device of claim 1, wherein said housing has a generally cylindrical shape.

3. The retaining device of claim 1, wherein said gripping member is fixedly retained within said housing bore.

4. The retaining device of claim 3, wherein said gripping member is retained within the housing bore in a snap fit arrangement.

5. The retaining device of claim 1, wherein said burst hole projections are aligned in at least one annular row.

6. The retaining device of claim 5, wherein said gripping member includes five annular rows of said burst hole projections that extend across said gripping member.

7. The retaining device of claim 1, wherein at least a first plurality of said burst hole projections have different heights.

8. The retaining device of claim 1, wherein said housing comprises a split-ring type housing.

9. A pipe coupling wherein a pipe is freely insertable into the coupling, comprising:
    a hollow body having external threads and a tapered inner surface;
    a nut having internal threads co-operable with said body external thread at a first end and an outwardly converging inner tapered surface at a second end; and
    a deformable gripping member assembly having a housing and a gripping member, said housing having an internal port adapted to receive said gripping member therein, said housing port having an internal surface, said gripping member having longitudinal and parallel axes, and first and second surfaces, said first surface being matingly similar to said body internal surface, said gripping member including a plurality of burst hole projections that extend outwardly from said second surface, each of said burst hole projections having a plurality of walls, at least one of said walls having an orientation that is not parallel to said longitudinal and parallel axes of said gripping member,
    wherein upon tightening of said nut, said nut tapered inner surface abuts against and exerts a force on said first surface of said gripping member in substantially longitudinal and radial directions to thereby cause said gripping member to be urged both radially and longitudinally into said pipe when said pipe is inserted into said coupling, whereby said gripping member substantially restricts longitudinal and rotational movement of said pipe.

10. The pipe coupling of claim 9, wherein said burst hole projections are aligned in at least one annular row.

11. The pipe coupling of claim 10, wherein said gripping member includes five annular rows of said burst hole projections that extend across said gripping member.

12. The pipe coupling of claim 9, wherein at least a first plurality of said burst hole projections have different heights.

13. The pipe coupling of claim 9, wherein said housing internal surface includes a plurality of outwardly extending projections.

14. The pipe coupling of claim 13, wherein said gripping member includes a plurality of apertures adapted to receive said housing projections when said gripping member is disposed in said housing internal port.

* * * * *